United States Patent [19]

Dziekan

[11] Patent Number: 4,954,192

[45] Date of Patent: Sep. 4, 1990

[54] PROCESS FOR APPLYING IDENTIFICATION TO OBJECTS MADE OF POROUS MATERIAL

[75] Inventor: John T. Dziekan, Racine, Wis.

[73] Assignee: Pristine Products, Racine, Wis.

[21] Appl. No.: 400,673

[22] Filed: Aug. 30, 1989

[51] Int. Cl.[5] .......................... B05D 1/32; B05D 3/00; B29C 39/12; B44C 1/22

[52] U.S. Cl. .................................... 156/154; 156/155; 156/631; 156/632; 156/633; 264/133; 264/139; 264/162; 264/233; 264/246; 427/154; 427/272; 427/273; 427/276; 427/282; 427/287; 427/289

[58] Field of Search ............... 264/139, 133, 162, 154, 264/233, 245–247, 254, 256; 156/154, 155, 631–633; 427/154, 282, 272, 273, 276, 287, 289

[56] References Cited

U.S. PATENT DOCUMENTS

| | | | |
|---|---|---|---|
| 667,898 | 2/1901 | Wilcke | 156/631 |
| 3,117,403 | 1/1964 | Jack et al. | 156/154 X |
| 3,463,653 | 8/1969 | Letter | 264/162 X |
| 4,316,766 | 2/1982 | Levin et al. | 156/631 |
| 4,781,792 | 11/1988 | Hogan | 156/631 X |

*Primary Examiner*—Jan H. Silbaugh

*Assistant Examiner*—Karen D. Kutach

*Attorney, Agent, or Firm*—Nilles & Nilles

[57] ABSTRACT

A process for applying a permanent filled engraved identification to the surface of an object such as a paving brick which is made of porous material. The process includes the steps of coating the surface of the object on which the identification is to be applied with a water soluble sealant and allowing the coating to dry; removably adhering a stencil, which has been prepared by perforating a stencil material to provide an opening defining the identification to be applied, to the dry coated surface; applying a stream of material to the adhered stencil opening to remove the soluble sealant coating and a portion of the porous material to a desired depth to provide an engraved identification in the object; removing the stencil from the object; applying a flowable filler material that will set in and fill the engraved identification; allowing the filler material to set; and applying water to the object for a period of time sufficient to dissolve the water soluble sealant and cause any of the filler material which is not in the engraved identification to be released and removed from the surface of the object.

11 Claims, 1 Drawing Sheet

PROCESS FOR APPLYING IDENTIFICATION TO OBJECTS MADE OF POROUS MATERIAL

BACKGROUND OF THE INVENTION

1. Field of the Invention

This invention relates to a process for applying an identification to an object made of a porous material and more specifically to placing an identification on building materials such as paving bricks that utilizes a hardenable filler in an engraved identification thereon.

2. Description of the Prior Art

In the prior art the usual practice for applying personalized identification to porous hardened building materials such as bricks has been to impress the desired identification into the soft clay before the brick is hardened. This is an acceptable practice when the same identification is repeated on a large volume of bricks. However, there is an increasing need to apply customized unique identification to building materials. For example, bricks are widely used for paving. Many customers desire customized identification on their paving bricks which may include letters, numbers or designs. The application of surnames, company names and addresses is most frequently desired and it is not unusual for a customer to request customized identification on several hundred or more bricks. In those situations wherein a custom identification was required for each brick or on a small number of bricks, it has been the practice to carve the identification on each brick or other object in some manner after the brick has been hardened. The reason for carving is that the cost of making and changing the brick molds with individualized identification where only one or a small number of bricks are to be produced is prohibitively expensive. However, stone carving is also expensive and not economically feasible for manufacturing runs of several hundred bricks.

Another problem that arises is that when an identification is embossed or carved into the brick, the recessed area is of the same general color as that of the brick and thus offers little or no color contrast. Lack of color contrast results in the identification not being readily discernible and appreciated esthetically even at short viewing distances. To overcome the lack of discernibility, it is a known practice to place some type of settable or hardenable filler, preferably of a contrasting color, in the embossed or carved identification. Applying the filler only into the engraved identification and not the adjacent surface is very difficult, slow and costly. Thus the practice has developed of wiping the filler over the surface of the brick to impress it into the embossed identification. The drawback to the practice of wiping is that the filler is also impressed into the pores of the brick. The filler impressed into the pores makes the brick unattractive and must be removed. Removal of the filler from the surface around the identification is expensive and in some instances impossible. For example, one of the most preferred fillers is epoxy resin because it flows easily into the identification, is extremely durable under all service conditions, and has tenacious gripping ability. Ironically, these desirable qualities make epoxy fillers extremely difficult to apply to porous materials such as paving bricks.

The use of stencils or masks to keep the epoxy off of porous surfaces adjacent the identification is common. Even when masking stencils are used around the identification the epoxy tends to leak under the stencil or mask and flow or run onto the surrounding surface. This leaking is compounded when pressure is applied, for example, by a putty knife, frequently used to assure uniform filling of the identification. Moreover, if the stencil is left on the brick until after the epoxy hardens, removal of the stencil becomes more difficult, and if the stencil is removed before the epoxy hardens there is risk that removal may cause excess epoxy in the identification to inadvertently flow onto surfaces adjacent the identification. There is no practical way known to dissolve hardened epoxy and remove it from the pores of the brick, and surface grinding is expensive and may be unacceptable because it changes the texture and appearance of the surface of the brick.

Thus heretofore the prior art has not disclosed a low cost efficient process to enable individualized embossed or engraved identification to be placed on objects made of porous material and then filled with a filler such as epoxy resin to highlight such identification in a neat and clean manner which will result in a finished product having no unwanted filler in the pores of the surface adjacent the identification.

SUMMARY OF THE INVENTION

In accordance with the present invention, a process is disclosed for applying a permanent filled engraved identification to the surface of an object such as paving brick made of porous material. The process comprises the steps of (a) coating the surface on which the identification is to be applied with a water soluble sealant; (b) removably adhering a stencil which has been prepared by perforating a stencil material to provide an opening therein defining the identification to be applied to said coated surface; (c) applying a stream of material to said adhered stencil opening to remove said soluble sealant coating and a portion of said porous material to a desired depth to provide an engraved identification in the surface of said object; (d) applying a flowable filler material that will set to said stencil surface to fill said engraved identification; (e) removing said stencil from said object; (f) allowing said filler to set; and (g) applying water to said object for a period of time sufficient to dissolve said water soluble sealant and cause any of said filler not in said engraved identification to be released and removed from the surface of said object.

Preferably the sealant applied to the surface of the object is sodium silicate and will be applied in two coats. The first coat of sodium silicate is allowed to dry and the second coat of sodium silicate is then applied. The second coat is allowed to dry before applying a stencil. The sodium silicate exposed by the stencil openings is removed by sandblasting which is continued until a portion of the underlying porous material in the object is also removed to provide an engraved identification. Preferably the filler is an epoxy resin which is applied to the surface of the material and forced into the engraved identification by pressure. The stencil is preferably removed before the filler material is applied and the surface of the object is struck off or scraped to provide a preliminary removal of excess filler before the filler material has set. The epoxy resin may be colored as desired.

BRIEF DESCRIPTION OF THE DRAWINGS

Referring to the drawings.

DESCRIPTION OF THE PREFERRED EMBODIMENT

The process for applying a permanent identification will be described relative to a paving brick but this process could be utilized for applying any customized identification to any object made of porous material such as clay or tile.

Figure 1:
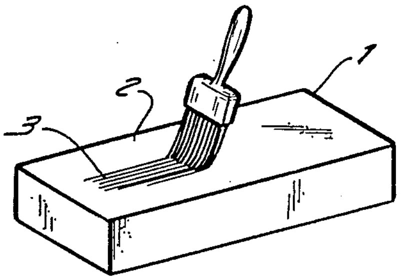
FIG. 1 is a perspective showing of the application of one or more coatings to the object, such as a paving brick, on which an identification is to be engraved.

As shown in FIG. 1, the process will be illustrated with reference to the application of a name to the top surface 2 of a paving brick 1. When the bricks are used to pave an area, the top surface of the brick or bricks, personalized with the name of the owner, will be clearly visable. The process could also be used to apply designs, dates, quality control information, warnings, notices and the like.

Prior to the process of applying the identification, the paving brick is inspected for flaws and imperfections to ensure that a uniform clean, solid top surface is available. If the surface of the paving brick is dirty it should be cleaned.

The first step of the process comprises coating the top surface 2 of the paving brick on which identification is to be applied with a water soluble sealant 3. Preferably the water soluble sealant coating comprises sodium silicate $NaSi_2$. Sodium silicate is commercially available in dry powdered or premixed liquid form from M. P. Iding Company, Inc. of Milwaukee, Wis. If a dry powdered form is used it should be mixed with water to form a viscous syrupy liquid. The sodium silicate liquid is allowed to be absorbed into the surface of the paving brick and to dry. In order to assure sealing of all pores in the surface it is preferable to apply a second coat of sodium silicate over the first coat. The second coat need not be as thick as the first coat, and the sodium silicate may be thinned at a ratio of five parts sodium silicate liquid to one part of water.

The second step of the process comprises removably adhering a stencil 5 to the coated surface of the paving brick. The stencil can be prepared in a conventional manner by perforating any suitable stencil material to provide openings 6 therein which define the identification which is to be applied to the surface of the paving brick. The portion of the stencil which is removed to provide the openings 6, referred to as the weed area, may be removed prior to the stencil being applied to the paving brick or after the stencil has been applied to the paving brick. The stencil may be prepared either by hand cutting, die cutting or cutting by a computerized machine. If desired, individual designs may be prepared or transferred to the stencil by conventional manner such as tracing and then hand cut. Preferably the stencil will be made of a rubberized material. A water soluble stencil adhesive may then be applied over the dry sodium silicate coatings and the stencil attached by means of this adhesive. Under some circumstances this adhesive may not be needed. As the stencil is being attached it is aligned to locate the identification on the desired area of the brick.

The third step of the process involves applying a stream of material 7 to the adhered stencil openings to remove the soluble sealant coatings exposed thereby and a portion of the porous material to a desired depth to provide an engraved identification in the surface of the object. Preferably the material in the stream of material used is sand, such as $AlO_2$, applied by a conventional sandblasting nozzle 8. In the alternative it would be possible to chemically engrave the exposed areas by use of suitable solvents.

The fourth step of the process comprises removing the stencil 5.

Figure 5:
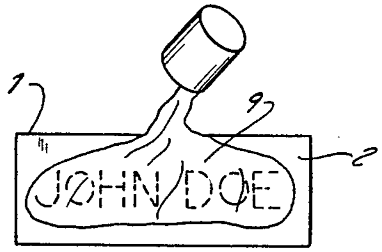
FIG. 5 is a diagrammatic showing of the application of the filler material to the surface of the material and into the engraved identification.
Figure 3:
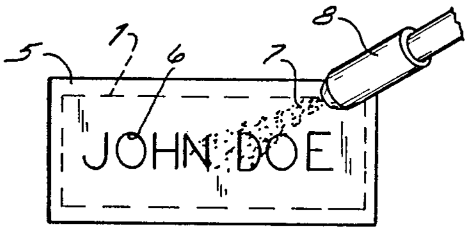
FIG. 3 is a diagrammatic showing of the removal of the exposed coatings and underlying material of the paving brick to create an engraved identification in the surface thereof.
Figure 6:
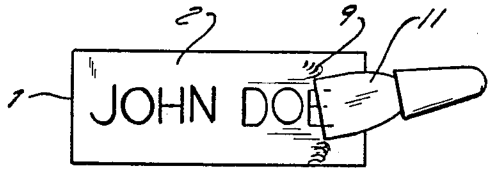
FIG. 6 is a diagrammatic showing of the initial removal of excess filler from the brick.
Figure 4:
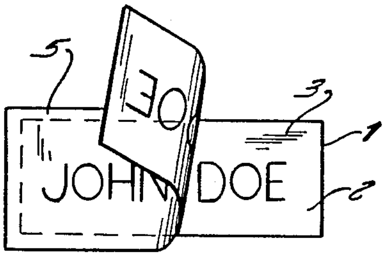
FIG. 4 is a diagrammatic showing of the removal of the stencil.

The fifth step comprises applying a flowable filler material 9 (FIG. 5) that will set in the engraved identification. Preferably the filler will comprise an epoxy resin which has been colored by addition of a colored paste to be of a tone and hue which will contrast with the color of the paving brick. The epoxy resin is allowed to flow into the engraved area. However, if desired, pressure may be applied to the epoxy in any suitable manner, as for example by a putty knife or roller (not shown), to ensure uniform flow into all of the engraved areas. Any air bubbles which may exist in the epoxy will rise to the surface and if they do not normally break they should be punctured to eliminate any air pockets in the epoxy filler.

The sixth step of the process comprises the initial removal of the excess filler material from the surface of the brick. The epoxy filler is struck off or scraped flat with the top surface of the brick by a suitable means, such as scraper 11, while the epoxy is still wet to maximize the amount of epoxy removed from the brick while in an unset state. Some epoxy will remain on the brick and this will be referred to as epoxy flashing.

Figure 7:
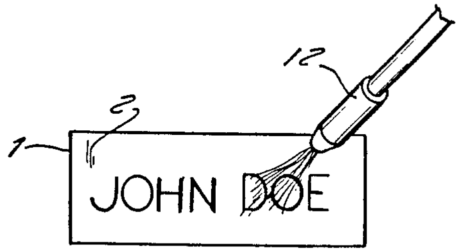
FIG. 7 is a diagrammatic showing of the final removal of the filler and sealant.

The seventh step (FIG. 7) of the process comprises the final removal of the filler from the top surface of the brick surrounding the engraved identification. To accomplish the final removal water is applied to the brick in any suitable manner as by spraying, soaking or steaming to dissolve the sodium silicate and any water soluble stencil adhesive that was not removed with the stencil. The brick may be subjected to a high pressure wash from washer nozzle 12 to assist in removal of any epoxy flashing from the top surface of the brick adjacent to the engraved identification. Because of the water dissolution of the sodium silicate, the underlying support for the epoxy flash is removed. Due to the fact that the interface between the epoxy flash and the epoxy actually filling the engraved identification is extremely thin, the application of the pressure washer fluid will fracture and eliminate most, if not all, of the undesirable epoxy flash located outside of the engraved identification proper.

Figure 8:
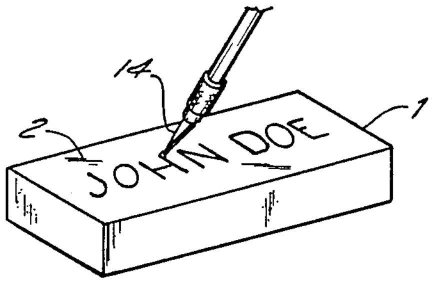
FIG. 8 is a perspective view of the brick after washing off the sodium silicate and then being finally trimmed of epoxy flash by means of a sharp instrument.
Figure 2:
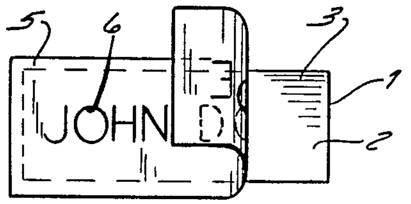
FIG. 2 is a diagrammatic showing of the application of a stencil to the paving brick.

If extreme precision of identification is required, as for example in a corner stone, any uneven edges of the epoxy remaining after washing and dissolving of the sodium silicate can be trimmed with a razor knife 14 (FIG. 8) or other similar sharp instrument.

EXAMPLE OF THE DISCLOSED PROCESS

A standard concrete paving brick having a surface dimension of 4×8 inches was inspected to assure that the surface was clean and smooth. The paving brick was subjected to the following process.

(1) The surface of the brick was first coated with sodium silicate available in liquid form from a chemical supply house. One source of a standard sodium silicate is M. P. Iding Company, Inc., 3420 W. Pierce Street, Milwaukee, Wis. 53215. The first coat of sodium silicate was allowed to dry for 45 minutes.

(2) A second coat of sodium silicate thinned at a ratio of five parts sodium silicate diluted by one part of water was then applied to the surface of the paving brick and allowed to dry for at least 60 minutes to ensure that the two coats of sodium silicate were completely dry.

(3) If necessary, a water soluble stencil adhesive obtained from Anchor Continental of Columbus, S.C. 29250, Catalog No. 333, may be applied over the two coats of sodium silicate and allowed to dry to a tacky state.

(4) A prepared stencil cut from a rubberized stencil material was then applied to the tacky adhesive coated brick surface and aligned so that the lettering was located within the desired parameters. The weed areas of the stencil were then removed.

(5) The brick was engraved by sandblasting with $AlO_2$ at a pressure of 80 psi to provide an engraved identification having a depth of approximately 1/16 to ⅛ inch.

(6) The stencil was then removed.

(7) An epoxy filler is used which is manufactured by M-R Plastics and Coatings, 2494 Adie Road, St. Louis, Mo. 63043 and known as MISTAPOX 100-H. Colored paste may be added and mixed in thoroughly. The colored epoxy filler was poured onto the top of the brick and pressed into the engraved area by means of a putty knife. Any air bubbles that arose were punctured to eliminate air pockets.

(8) While the epoxy was unset any excess epoxy in the engraved identification was struck or scraped off to leave the epoxy filler flat with the top surface of the paving brick.

(9) The brick was allowed to stand until the epoxy hardened. The setting period may be anywhere, for example, from 45 minutes to 48 hours depending on the type of epoxy used, the temperature and the humidity.

(10) The brick was then soaked thoroughly with water until the sodium silicate sealer and the soluble stencil adhesive dissolved. The brick was then subjected to a high pressured water stream at 1,800 psi to remove any sodium silicate and stencil adhesive along with any epoxy filler flash remaining on the top surface of the brick.

(11) The brick was allowed to dry in atmospheric air.

The above process produced a brick in which the epoxy material was intimately and tenaciously bonded to the engraved identification and all epoxy filler which coated the top surfaces of the brick adjacent the engraved identification was removed by the wash soak and pressure washing.

With reference to the foregoing, the present invention provides an improved process for providing an epoxy filled engraved identification on an object made of porous material in a simple and low cost manner assuring that none of the epoxy coats areas outside of the engraved identification to mar the aesthetic qualities of the object. The process shown and described is by way of example and not as a limitation. Variations to the process may be made by those skilled in the art without departing from the concept of the present invention.

What is claimed is:

1. A process for applying a permanent filled engraved identification to the surface of an object made of porous material comprising the steps of:
   A. coating said surface on which the identification is to be applied with a water soluble sealant of sodium silicate and allowing said coating to dry; applying a second coat of sodium silicate and allowing it to dry;
   B. placing a perforated stencil on said surface to provide an opening defining the identification to be applied;
   C. removing said soluble sealant coating and a portion of said porous material from said stencil opening and to a desired depth in said object to provide an engraved identification in said object;
   D. removing said stencil from said object;
   E. applying a flowable epoxy resin to said engraved identification, which resin will set in and fill said engraved identification;
   F. allowing said resin to set; and
   G. applying water to said object for a period of time sufficient to dissolve said water soluble sealant and cause any of said resin which is not in said engraved identification to be released and removed from said surface o said object.

2. A process for applying a permanent filled engraved identification to the surface of an object made of porous material comprising the steps of:
   A. coating said surface on which said identification is to be applied with a water soluble sealant and allowing said coating to dry;
   B. removably adhering a stencil, which has been prepared by perforating a stencil material to provide an opening defining said identification to be applied, to said dry coated surface;
   C. applying a stream of material to said adhered stencil opening to remove said water soluble sealant coating and a portion of said porous material to a desired depth to provide said engraved identification in said object;
   D. removing said stencil from said object;
   E. applying a flowable filler material to said engraved identification, which material will set in and fill said engraved identification;
   F. allowing said filler material to set; and
   G. applying water to said object for a period of time sufficient to dissolve said water soluble sealant and cause any of said filler material not in said engraved identification to be released and removed from said surface of said object 3. A process according to claim 2 comprising in step E the further step of scraping said surface of said object before said filler material has set.

4. A process according to claim 2 wherein said step A further comprises:
   coating said surface with a first coat of sodium silicate;
   allowing said first coat to dry;
   applying a second coat of sodium silicate; and
   allowing said second coat to dry before applying said stencil.

5. A process according to claim 2 wherein step B further comprises applying a water soluble stencil adhesive to said dry coated surface to adhere said stencil thereto.

6. A process according to claim 2 wherein in step C, said stream of material comprises $AlO_2$ applied to said identification opening in said stencil under high pressure.

7. A process according to claim 2 wherein in step E said flowable settable material comprises epoxy resin which may be colored as desired.

8. A process according to claim 7 wherein in step E said epoxy resin is applied onto the top of said object and forced by pressure into said engraved identification.

9. A process for making a paving brick having an engraved portion on a surface of said brick and in which process said engraved portion is permanently filled with an epoxy resin, the process comprising the steps of:

A. coating said surface with a water soluble sealant and allowing said coating to dry;

B. applying a water soluble adhesive to said surface;

C. removably adhering a stencil to said surface, which stencil provides an opening defining an engraving;

D. removing said soluble sealant coating and a portion of said brick from said engraving defined by said stencil to a desired depth to provide said engraving in said brick;

E. applying epoxy resin to fill said engraving;

F. removing said stencil from said brick;

G. allowing said resin to set; and

H. applying water to said brick for a period of time sufficient to dissolve said water soluble sealant on said brick surface and cause any of said epoxy resin material not in said engraving to be released and removed from said surface of said brick.

10. A process according to claim 9 further including the step of scraping said surface of said brick after said stencil has been removed to remove said resin from said surface.

11. A process according to claim 9 wherein said step A further comprises:

coating said surface with a first coat of sodium silicate;

allowing said first coat to dry;

applying a second coat of sodium silicate; and allowing said second coat to dry before applying said adhesive to said surface.

* * * * *